(12) United States Patent
Stoy et al.

(10) Patent No.: US 6,451,922 B2
(45) Date of Patent: Sep. 17, 2002

(54) METHOD OF MAKING SYNTHETIC HYDROPHILIC POLYMERS AND PRODUCTS RESULTING THEREFROM

(75) Inventors: Vladimer A. Stoy, Princeton, NJ (US); Petr Stehlicek, Kladno (CZ); Zdena Kozlova, Beroun (CZ); Tomas Drunecky, Kladno (CZ)

(73) Assignee: Replication Medical, Inc., Bloomfield, MI (US)

( * ) Notice: Subject to any disclaimer, the term of this patent is extended or adjusted under 35 U.S.C. 154(b) by 0 days.

(21) Appl. No.: 09/838,020

(22) Filed: Apr. 19, 2001

Related U.S. Application Data

(63) Continuation-in-part of application No. 09/409,995, filed on Sep. 30, 1999, now Pat. No. 6,232,406.

(51) Int. Cl.[7] .................................................. C08F 8/12
(52) U.S. Cl. .................... 525/329.1; 524/827; 524/829; 524/830; 524/831; 525/329.2; 525/354
(58) Field of Search ................................ 524/827, 829, 524/830, 831; 521/329.1, 329.2, 354

(56) References Cited

U.S. PATENT DOCUMENTS

| 3,200,102 A | 8/1965 | Kleiner |
| 3,897,382 A | 7/1975 | Stoy et al. |
| 3,926,930 A | 12/1975 | Ohfuka et al. |
| 4,107,121 A | 8/1978 | Stoy |
| 4,337,327 A | 6/1982 | Stoy |
| 4,379,874 A | 4/1983 | Stoy |
| 4,420,589 A | 12/1983 | Stoy |
| 4,943,618 A | 7/1990 | Stoy et al. |
| 5,252,692 A | 10/1993 | Lovy et al. |

OTHER PUBLICATIONS

Philip Molyneux: Water–soluble Synthetic Polymers, vol. I and II, CRC Press, Inc., Boca Raton, FL (1987).

Joseph D.Andrade (Ed.): Hydrogels for medical and related applications, American Chemical Society, Washington, DC (1976).

V. Stoy, Calculation Of The Elementary Rate Constants Of Polymer–Analogous Reactions And Sequence Analysis Of Products, Journal Of Polymer Science, vol. 15, 1029–1033, 1977.

*Primary Examiner*—Bernard Lipman
(74) *Attorney, Agent, or Firm*—Carter, DeLuca, Farrell & Schmidt LLP

(57) ABSTRACT

The present invention involves a method of making a multiblock copolymer containing two or more types of sequences of derivatives of acrylic acid with at least one derivative being acrylic acid salt and at least one being acrylamide. The method includes:

(e) in sequence, a first step being a catalytic reaction of nitrile groups in polyacrylonitrile dissolved in an inorganic aqueous solvent of polyacrylonitrile; and, (f) at least one subsequent step being at least one catalytic reaction of nitrile groups in absence of polyacrylonitrile solvents.The present invention also pertains to the products resulting from the method.

20 Claims, No Drawings

METHOD OF MAKING SYNTHETIC HYDROPHILIC POLYMERS AND PRODUCTS RESULTING THEREFROM

REFERENCES TO RELATED APPLICATIONS

This Application is a continuation-in-part of U.S. patent application Ser. No. 09/409,995 filed on Sep. 30, 1999, now U.S. Pat. No. 6,232,406, entitled "Hydrogel and Method of Making", with Vladimir A. Stoy as inventor.

BACKGROUND OF THE INVENTION

1. Field of the Invention

The present invention relates to hydrophilic polymers and their preparation. More specifically, the present invention relates to improved methods of making synthetic hydrophilic polymers in a controlled fashion to reduce or eliminate short block formation and ensuing difficulties, by specified multistep reaction sequences.

2. Information Disclosure Statement

Hydrophilic polymers are useful for a large number of applications in medicine, agriculture, pharmacy, the food industry, cosmetics, construction, and other fields. Many hydrophilic polymers are water soluble in a large range of temperatures and pH. Some such polymers are derived from natural sources. Examples of these are agar, gelatin, carboxymethylcellulose, hyaluronic acid, alginic acid, and many others. In many applications, the disadvantage of natural polymers is their capacity for hydrolytic and biological degradation, often along with low availability and a high price.

For that reason a whole variety of synthetic polymers were developed, whether entirely water soluble ones or ones gelling under certain conditions. An example of these are polyvinyl alcohol, polyethylene oxide, polyvinyl ether, polyvinyl pyrrolidone, polyacrylic acid, or poly-2-hydroxyethylmethacrylate prepared by polymerizing appropriate monomers. Hydrophilic polymers are described in a number of publications, such as:

Philip Molyneux: Water-soluble Synthetic Polymers, Vol. I and II, CRC Press, Inc., Boca Raton, Fla. (1987)

Nikoloas A. Peppas (Ed.): Hydrogels in medicine and pharmacy, Vol. I to III, CRC Press, Inc., Joseph D. Andrade (Ed.): Hydrogels for medical and related applications, American Chemical Society, Washington, D.C. (1976)

Hydrophilic derivatives of polyacrylic and polymethacrylic acids are also sometimes prepared using hydrolysis or aminolysis of polyacrylonitrile (PAN) or polymethacrylonitrile (PMAN). The hydrolysis of PAN is described in a number of patents, such as the U.S. Pat. No. 3,926,930 (Ohfuka et al) and the U.S. Pat. No. 3,200,102 (H. Kleiner).

Of special value are the products of partial hydrolysis or aminolysis, which have a character of block copolymers. In these, blocks of hydrophilic acrylic groups alternate with blocks of hydrophobic acrylonitrile units. These so-called "multiblock copolymers" form hydrogels or viscous aqueous solutions under certain gelling conditions. Such polymers are described in a number of patents such as the U.S. Pat. Nos. 4,337,327; 4,379,874; 4,420,589; 3,897,382.

An alkali-catalyzed PAN hydrolysis can be performed in an aqueous NaSCN solution, as described for example in the U.S. Pat. No. 4,107,121 (Stoy). The nitrile group in PAN can also react with alcohols, hydrazine, hydroxylamine, etc. and form subsequent derivatives of acrylic acid. This non-hydrolytic reaction of PAN solutions result in randomly arranged rather than multiblock copolymers, however. Multiblock copolymers can be prepared using these reactions in a so-called "aquagel state", as described in the U.S. Pat. No. 4,943,618 (V. Stoy, G. Stoy and Lovy).

Multiblock copolymers of acrylonitrile with various annexed groups can also be prepared by PAN aminolysis, as described in the U.S. Pat. No. 5,252,692 (Lovy and Stoy). As apparent from the above list, these copolymers can be created under various conditions: partial hydrolysis in the solutions of strong acids, acid or alkaline heterogeneous hydrolysis, solution-based alkaline hydrolysis, solution-based or heterogeneous aminolysis, hydrazinolysis, and other reactions.

Methods used to date have a number of limitations. One of these is the necessity of interrupting the reaction during a certain, but incomplete, reaction conversion in order to retain remnant nitrile group sequences. If one of the co-reagents is water, which is usually present in these reactions in a significant molar excess, these reactions must be terminated by the washing out or neutralization of the acidic or alkaline catalyst as soon as the desired reaction conversion is attained. Accurate reaction termination requires meticulous observation of its progress and a rapid interruption at a certain point in time; otherwise the product could be worthless.

The washing out of the catalyst requires a certain period of time, during which the reaction continues in those places where the catalyst concentration remains high. This increases the heterogeneity and decreases the quality of the product. The heterogeneity is especially high in reactions where PAN is in a solid state, whether in the form of suspended particles, fibers, or an aquagel. The kinetics of the reaction in these cases is also complicated by the diffusion of the reagent and the catalyst into the polymer.

A better homogeneity of the product is generally achieved using a solution-based reaction, where the resulting polymer is dissolved in a suitable solvent, such as a concentrated inorganic acid (nitric or phosphoric acid), a concentrated zinc chloride solution, or a concentrated sodium thiocyanate solution. Even in these cases the product is somewhat heterogeneous, however, especially in terms of the distribution of the block lengths. The distribution of the block length approximates the 1. Markovian distribution, which in practical terms means that short group sequences are over-represented. The kinetics and statistical distribution of groups were described in a number of papers, such as the following:

Stoy, V. A., Journal of Polymer Science, Chemistry Edition, 15: 1029 (1977)

The presence of short sequences (short blocks) negatively affects the quality of phase separation and thus also the quality of crystalline domains and the resulting mechanical properties (especially shape and thermal stability).

When using a solution-based reaction, the solvent as well as the catalyst needs to be removed from the product. The catalyst and solvent removal using water extraction does not generally present significant problems as long as the resulting product is entirely insoluble in water and forms a low-swelling hydrogel. When the resulting product strongly swells in water or is partially or entirely water soluble, however, it's isolation from the reaction mixture is difficult. It is usually difficult or even impossible to coagulate it using water because of strong swelling or even dissolution of a certain fraction of the product, which results in low yields. In these cases, it is practically impossible to isolate the whole product with its original length and distribution of polymer chains. This decreases the quality control of the end product and often negatively affects it's properties.

A disadvantage in such cases is the necessity of isolation and purification of the product using precipitation in organic solvents, dialysis, and other techniques, which significantly increase the production cost and affect the product quality.

Another disadvantage of present production technologies is the limitation to products, which contain at most two types of blocks: one hydrophobic (remnant continuous sequences of units with pendant nitrile groups in 1,3 positions) and one hydrophilic (continuous sequence of groups formed by a particular reaction of the nitrile group, such as for example the acrylamide created by an acid-catalyzed addition of water to form a nitrile). For a number of applications it is advantageous that the polymer contains two or more types of hydrophilic blocks (such as one with neutral and one with negatively charged groups). Such polymers were not described to date and for the above stated reasons, the present invention methods and resulting products are neither anticipated nor rendered obvious thereby.

SUMMARY OF THE INVENTION

The present invention involves a method of making a multiblock copolymer containing two or more types of sequences of derivatives of acrylic acid with at least one derivative being acrylic acid salt and at least one being acrylamide. The method includes:

(a) in sequence, a first step being a catalytic reaction of nitrile groups in polyacrylonitrile dissolved in an inorganic aqueous solvent of polyacrylonitrile; and, (b) at least one subsequent step being at least one catalytic reaction of nitrile groups in absence of polyacrylonitrile solvents. The present invention also pertains to the products resulting from the method.

DETAILED DESCRIPTION OF THE PRESENT INVENTION

The present invention is directed to novel multiblock copolymers with improved distribution of hydrophobic and hydrophilic blocks leading to improved thermal stability of resulting hydrogels as well as improved physical, rheological and mechanical properties. Optionally, these copolymers have two or more different types of hydrophilic blocks. This invention also describes an improved method for manufacturing such highly hydrophilic multiblock acrylic copolymers.

The invention is based on the discovery that the reaction mechanism of nitrile conversion to hydrophilic acrylic derivatives depends on the physical environment of nitrile groups at the time of the reaction. Multiblock acrylic copolymers were hitherto manufactured either by a reaction of solid state PAN with nitrile groups built into crystalline domains and leading to heterogeneity of reaction products; or by a solution reaction in presence of PAN solvents, with nitrile groups in a solvated state and leading to broad distribution of lengths of residual polyacrylonitrile blocks with a large fraction of short nitrile sequences. The presence of short sequences of either nitrile or hydrophilic groups causes defects in crystalline domains which, in turn, causes thermal instability, creep under stress and other problems.

The present invention improved multiblock acrylic copolymers can be prepared by a multi-stage process in which the first reaction step is a reaction of PAN dissolved in aqueous inorganic solvents and the subsequent step(s) is(are) base-catalyzed reaction(s) of nitrites in the presence of water and the absence of PAN solvents. The fist-stage solution reaction can be either partial hydrolysis or partial aminolysis of PAN. This leads to the first-stage multiblock copolymer with broad distribution of both nitrile and hydrophilic sequences. Inorganic solvent is removed by coagulation of polymer to form a hydrogel. Coagulation causes phase separation and formation of crystalline phase formed by predominantly hydrophobic nitrile-containing sequences. In the second stage, the reaction is performed in the hydrogel state using alkali metal hydroxide as the catalyst. The reaction proceeds more readily on nitrites that are in "defective" crystalline domains built from prevailingly short blocks while domains of higher crystallinity, built from longer nitrile sequences, remain mostly intact. The "natural selection" of sequences leads to enrichment of the nitrile block population by longer nitrile sequences with beneficial effect on crystallinity and propeties of the resulting hydrogel.

This step can be repeated using different reaction conditions resulting in different funcional groups. Several types of hydrophilic sequences can be thus created in each chain of the resulting multiblock copolymer.

Preferred Embodiments

The first step reaction starts with polyacrylonitrile or polymethacrylonitrile (hereafter collectively called PAN) having at least 85 molar % of units with pendant nitrile groups. The first-stage reaction of the present invention, if typically run to a relatively low reaction conversion, will create a hydrogel with a low to medium degree of equilibrium swelling. The intermediate hydrogel can readily be prepared using an acid or an alkali catalyzed PAN solution hydrolysis, as described in several of the patents listed above. The preferred are intermediates with about 25 to 75 mol. % of nitriles converted into hydrophilic acrylic acid derivatives. Such a hydrogel is essentially insoluble in water and therefore can be easily isolated through coagulation in water or aqueous solutions. Moderate swelling aids the removal of excess of the remaining solvent, reagent, catalyst, and other water-soluble substances by washing in water.

This primary hydrogel reacts with the same or a different coreagent in the second stage of preparation, where it is mixed with the appropriate amount of catalyst and coreagent corresponding to the desired conversion of the second step reaction. The components of the reaction mixture are allowed to diffuse into the hydrogel at such a temperature at which the reaction occurs at a low rate (or does not occur at all). Subsequently, the temperature can be increased to speed the reaction up. An important aspect of the invention is the second stage, where the exclusively alkaline hydrolysis or alkali-catalyzed aminolysis occur in a large molar excess of water and in the absence of a PAN solvent. The reaction creates carboxyl groups, which bind and thus disactivate said alkaline catalyst. The reaction releases ammonia, which is not a strong enough base under these conditions to act as a catalyst for further hydrolysis (note that the reaction conditions described in previous patents are such that ammonia acts as a catalyst of both the hydrolysis and the aminolysis of PAN). In addition to carboxyl groups, the alkali-catalyzed reaction under these conditions yields acrylamidine and acrylamide units. If the reaction is aminolysis by a water-soluble primary amine, then at least part of the resulting acrylamide and acrylamidine is N-substituted. This is a convenient method for introducing various functional groups, such as additional carboxyles by reaction with alanine; sulfo-groups by reaction with taurine or N,N-dimethylamino groups by reaction with N,N-dimethylaminopropylamine. A preferred amine has the following general formula $H_2N$-Y-X where Y is an aliphatic chain with one to 12 carbons and X is a polar group selected from the group consisting of primary amine, secondary amine, tertiary amine, hydroxyl, carboxyl, sulfo-group, sulfate group or a group having the formula $[-O-C_2H_3R]_n$-Z where n is an integer from 1 to 50, R is H or $CH_3$ and Z is H, OH, OCH3.

As soon as the co-reagent and/or the catalyst are used up, the reaction will self-terminate at a predetermined product composition. It is not necessary to monitor the conversion reaction and to terminate the reaction, as was the case with prior art methods. All that is needed is the mixing of the primary gel with a calculated amount of water, a coreagent, and a catalyst, and maintaining the reaction mixture at an appropriate temperature until the reaction is completed. Because the catalyst and the co-reagent are used up during the desired conversion, it is not necessary to terminate the reaction by the removal of their excess.

The final copolymer does not often even need to be isolated. Since the reactive components were consumed or inactivated by the end of the last reaction step, the hydrogel product can be used as-is or after a simple washing or extraction. Highly hydrophilic or even water-soluble copolymers are obtained in the form of a stable gel concentrate, which can be processed directly or which can be dehydrated, milled, mixed with other desirable additives, or otherwise utilized. For this reason, our method is especially beneficial for the manufacture of highly swellable hydrogels and water-soluble polymers, which are otherwise difficult to isolate.

The second stage of the production process can even be repeated several times while using different co-reagents. This will create a variety of types of hydrophilic blocks with various chemical compositions. It is now possible to convert all nitrile groups into several types of hydrophilic blocks. This method can then be used to prepare water-soluble copolymers with two or more types of alternating hydrophilic blocks. For instance, the first step can be carried out using an acid catalyst to create neutral acrylamide blocks, while the second step can be carried out using alkaline hydrolysis to create amphotheric blocks countering acrylic acid, acrylamidine and acrylamide groups. It is even possible to create a multiblock copolymer, which contains blocks of both anionic and cationic character. Because of the association of blocks with opposite charges, the copolymers will create networks in aqueous solutions, which are necessary for the hydrogel formation. Copolymers with several types of hydrophilic blocks are new and desirable for a number of applications.

Hydroxides of alkali metals form desirable catalysts for the reaction, especially NaOH. The co-reagent in each instance is water, possibly also a primary amine miscible with water. Examples of suitable amines are monoethanoamine, 2-aminoethylsulfonic acid (taurine), amino acids such as alanine or arginine, N,N-dimethyaminopropylamine, glucosamine, and a number of other such compounds.

The first stage of the reaction can usually be controlled well. The first-stage hydrolysis can be performed in solutions of concentrated inorganic acid that are capable of dissolving PAN. For example, nitric acid can be used in a concentration over 60% by weight. Another example of such acid solvent is concentrated phosphoric acid as well as its mixtures with sulfuric acid. In this case the acids act as both the solvent and the catalyst of the hydrolysis, which occurs using the so-called zipper reaction together with the formation of amide blocks, possibly also with the formation of glutaramide cycles and carboxyls from the subsequent and/or side reactions of nitrile and amide groups. Another solvent candidate is also a concentrated solution of zinc chloride, and hydrogen chloride can be a beneficial catalyst in this situation. Acid-catalyzed homogeneous hydrolysis of PAN always occurs in the presence of a large molar excess of water while catalyst will be neither bound nor used up by the reaction. Therefore, it is necessary to carefully monitor the course of the reaction and to terminate it by cooling, coagulation, and the washing out of the catalyst once the desired conversion is attained.

One especially beneficial result of this invention is a process where the homogeneous PAN reaction in the first step is performed using a solution-based hydrolysis and/or aminolysis of PAN in concentrated aqueous solutions of thiocyanate using an alkali hydroxide catalyst, as described in U.S. Pat. No. 6,232,406. The main advantage of this process is the fact that the catalyst binds itself to the carboxyl group, and the reaction is thus terminated at full conversion. This dramatically improves the ease of quality control in the first stage, as well as the whole technological execution of the reaction. In case of a solution-based aminolysis of PAN, the reacting amine is being used up, which slows the reaction down or even stops it once the desired conversion is reached, and it's therefore easier to control.

Thus created multiblock copolymer must form hydrogel with a sufficient water content in order to allow a free diffusion of the co-reagent and the catalyst. On the other side, a too-high water content in the primary hydrogel is detrimental, because it makes the manipulation with the intermediate product more difficult, it requires larger volumes in the second stage of the reaction, and it lowers the resulting product concentration. It is therefore desirable if the intermediate product has such a degree of conversion after the first stage of the reaction sufficient for hydrogel formation which, after coagulation and washing are complete, contains more than 33% water by weight, and preferrably more than 60% but less than 99% water by weight. Especially advantageous are such first stage conversions, which produce hydrogels having between 75–93% of water by weight at laboratory temperature when in an equilibrium with a 0.9% NaCl aqueous solution. The molar conversion necessary to obtain a hydrogel with these properties depends on the type of hydrophilic groups. In order to achieve a certain level of swelling, the conversion reaction must allow the formation of neutral groups higher than the conversion reaction, which provides ionogenic groups. It is beneficial to establish a first stage conversion level before starting the second stage, so that the composition of the reaction mixture for the second stage can be accurately determined, and to compensate for deviations from stage one if necessary.

Suitable raw materials for the first stage reactions are polymers and copolymers of acrylonitrile and methacrylonitrile which contain at least 85% mol. of pendant nitrile groups. The average molecular weight should be higher than 50,000, but lower than 500,000 Dalton. Polymers with a higher molecular weight form higher-viscosity solutions, which are difficult to process. Resulting polymers with a molecular weight lower than 50,000 Dalton form a considerable amount of water-soluble by-products and hydrogels of lower mechanical strength. It is especially beneficial to obtain starting polymers with an average molecular weight between 100,000 and 300,000 Dalton. (Unless it is specified otherwise, molecular weight means the weight average of molecular weight.)

The composition of the intermediate and final products can be controlled for individual stages and calculated in the following way:

1. The first stage of the reaction can be performed on PAN or it's copolymers using up to approx. 15% mol. of other than acrylonitrile or methacrylonitrile units (usual PAN copolymers contain methacrylate, styrene, acrylamide, methylmethacrylate and others, for example). The molar fraction of reactive nitrile groups in the starting PAN=$[CN]_0$>0.85

2. The fractional conversion in the first stage reaction let be $X_1$. In another words, the first stage of the reaction caused the change of the molar fraction $X_1$ of the originally present nitrile groups into certain hydrophilic derivatives of the acrylic acid, hereafter A. If the original PAN contained $[CN]_0$ moles of nitrile groups, then the multiblock copolymer after the first stage will contain $[CN]_0*X_1$ moles of groups A and $[CN]_0*(1-X_1)$ of moles of —CN groups.

3. Thus formed hydrogel, which is essentially free of solvents and catalysts from the first stage of the reaction, is mixed with water and an alkali catalyst selected from a group of hydroxides of alkali metals. If the second stage of the reaction involves aminolysis, then the mixture will also contain an appropriate primary amine such as taurine 2-hydroxyetylamine, or alanine. The catalyst is then added in a stoichiometric amount corresponding to the number of carboxyl groups expected at the desired conversion of the second stage reaction. In cases where the second stage involves aminolysis, the primary amine is used in an at least equimolar quantity corresponding to the N-substituted nitrogen content at the desired conversion. The amount of the added amine can be somewhat higher than the equimolar amount (but generally not by more than 25%), if the said catalyst is in the equimolar amount in relation to the carboxyl groups formed in the second reaction stage. Aminolysis will self-terminate at the point of desired conversion if the forming carboxyl groups bind the catalyst or if the amine is used up. We will call the groups forming in the second stage of the reaction B (but let's keep in mind that B can represent several chemical groups formed as a result of one reaction, and at least same of the B groups can have the same composition as groups A). The conversion of the second stage reaction is here called $X_2$, which is a fraction of the previously present —CN groups $[CN]_0*(1-X_1)$. The composition of the copolymer after the second stage of the reaction will then be as follows:

| | |
|---|---|
| $[CN]_0 * (1 - X_1) * (1 - X_2)$ | Groups —CN |
| $[CN]_0 * X_1$ | Groups A |
| $[CN]_0 * X_2 * (1 - X_1)$ | Groups B |

There can also be a third stage reaction with a conversion $X_3$, where the remnant nitrites are transformed into groups C, and possibly even into yet more stages, until the —CN groups are used up. The highest possible $n^{th}$ degree is such, where $[CN]_0*(1-X_1) \ldots *(1-X_n)$= or<0.

Once this last step is completed, there are no remaining nitrile groups in the product.

Polymers do not need to be isolated between individual higher degrees, new reagents are merely added along with fresh catalyst as needed. The product of the final reaction stage is a gel of certain polymer concentration that can be calculated in advance and controlled by maintaining proper concentrations and amounts of coreagents added between stages. Water can be evaporated between stages if high polymer concentration is desirable. The gel can be used as the final product, or it can be processed into dry powder or pellets. One of the reaction by-products is free ammonia, which should be removed from the gel. Ammonia can be removed by neutralizing it using a suitable acid (such as the citric acid). This will not only remove the ammonia odor; it will also give the product a lighter color and a better stability in storage.

The above stated reactions are often accompanied by a coloration of the product. This coloration can be lessened or removed if the reactions occur in the absence of oxygen, such as in a protective nitrogen atmosphere.

The products of this manufacturing process are hydrophilic polymers, which form polymer solutions, or hydrogels, when in an equilibrium with water. Especially valuable are thin gels containing more than 99% water by weight. These are physical gels capable of reversibly dissolving under a change of their temperature or pH environment. Especially advantageous products are those, which form at least two types of alternating blocks of various compositions. It is also advantageous for one of these blocks to contain remnant nitrile groups. Such copolymers are able to form non-Newtonian gels and liquid exhibiting distinct shear-thinning and thixotropy. In addition, they are also efficient emulsifiers, and emulsion stabilizers.

The process described in this invention bypasses several serious pitfalls common to other processes:

1. The resulting polymer does not need to be isolated by coagulation, or rendered free of catalysts and solvents in a state of high swelling; therefore it's production is less expensive and the product does not lose it's water-soluble polymer fractions (if they are present).

2. The second (or higher) stage(s) proceeds to a full conversion. Therefore it is not necessary to terminate the reaction at a predetermined point in time and risk the conversion to be incorrect, the product thus being rendered worthless.

3. The individual reaction stages can use various catalysts and co-reagents. Therefore, this process is useful for the synthesis of multiblock copolymers with one or more type of hydrophilic blocks.

4. The process is also usable for entirely water-soluble reaction products, which can be thus obtained directly in an aqueous concentrate format and which would otherwise be difficult to isolate without the use of organic solvents.

5. In the second stage of the reaction, short-sequence nitrile groups, which are not built into larger crystalline domains, react preferentially. This causes the enrichment of the fraction of long nitrile blocks, which form the stable and solid crystalline domains. This also narrows the block length distribution and the resulting mechanical properties of the hydrogel, such as strength, shape retention, and thermal stability. Therefore, this process leads to novel hydrogels of superior properties.

Our invention is further illustrated by the following non-limiting examples:

EXAMPLE 1

A thixotropic additive hydrogel is prepared by a two-stage procedure. In the first stage, 155 weight parts of polyacrylonitrile homopolymer having weight average molecular weight of 155,000 Dalton is dispersed in 450 weight parts of water. 605 weight parts of crystalline sodium thiocyanate are gradually added in the course of approximately three hours under stirring at temperature approximately 60° C. PAN is substantially dissolved during this period forming a viscous Solution A. Solution A is stirred for another 6 hours at approximately 70° C. to complete the dissolution and then cooled down below 25° C.

Solution B is prepared in another vessel. 15.5 weight parts of NaOH and 250 weight parts of sodium thiocyanate are dissolved in 250 weight parts of deionized water (DIW) at ambient temperature.

Solution A and B are mixed in weight ratio 2.347:1 in a stirred glass-lined reactor, at 22° C. The resulting master mix has the following composition (all percents are by weight):

| | |
|---|---|
| PAN | 8.98% |
| NaOH | 0.90% |
| Sodium Thiocyanate | 49.55% |
| Water | 40.57% |

This composition corresponds to molar ratio [NaOH/[CN]=0.1325

The mixture is filled into multiple glass containers with plastic enclosures. Each has volume approximately 10 [liters], height 330 [mm] and diameter 200[mm]. The closed containers are immersed in water bath and kept at temperature 70 oC. for 48 hours. Once temperature is increased, the mix in the containers quickly darkens and increases viscosity. Gradually, it becomes dark-brown rubbery solid. As the reaction continues, the color gradually changes from dark brown to reddish brown to dark orange to yellow color. At the same time, the composition liquefies to roughly the original viscosity. The resulting solution is a viscous liquid of honey-like appearance and of strong ammonia odor. The polymer composition is measured by NMR directly after the reaction and than again after 30-day storage in a glass bottle at ambient temperature all concentrations in molar percent). The compositions are identical within the method accuracy. Hydrogels made from the solution immediately after reaction and after 30 day solution storage are also identical, as shown by their water content (in weight percent) and appearance. Data indicating storage stability of the copolymer solution from the first reaction stage are summarized in the following table:

| | After reaction: | After 30 days: |
|---|---|---|
| Acrylonitrile units | 54.9% | 55.1% |
| Acrylic acid units: | 30.2% | 30.0% |
| Acrylamide units: | 8.9% | 9.3% |
| Acrylamidine units: | 6.0% | 5.8% |
| Hydrogel water content in DIW | 98.8% by wt. | 98.6% by wt. |
| Hydrogel liquid content in 0.9% by wt. NaCl | 90.6% by wt. | 90.6% by wt. |

The solution is substantially stable for even more prolonged periods of storage time at ambient conditions.

For further processing, containers are opened and discharged into a stainless steel vessel. The solution is heated to 55° C. for several hours under alternating application of vacuum and nitrogen. When the viscous solution is free of bubbles, it is discharged through a nozzle into water bath to coagulate into shape of a hydrogel rod. The hydrogel is washed several times in water and then with aqueous solution of 0.9% by weight NaCl until no sodium thiocyanate residue is detectable in the extract. Resulting primary hydrogel from the first reaction stage contains 90.6% by weight of isotonic saline.

This primary hydrogel dried and crudely ground to form pellets with particle size is approx. 3 mm. 50 weight parts of pellets were mixed with 500 weight parts of deionized water and left swelling in a closed container at 50° C. for 10 hours. Then the gel dispersion is cooled down to ambient temperature and 25 weight parts of aqueous NaOH solution containing 10 wt. % of NaOH is added and left enclosed for 24 hours at ambient temperature. At the end of the operation, water and NaOH are uniformly dispersed through the gel.

Temperature is then increased to 70° C. and maintained for 48 hrs. After cooling down, product of the second reaction stage is a sticky, soft gel with a distinct ammonia smell. To remove the smell, 3 wt. parts of citric powder is added and mixed in the dispersion. After that, gel can be packaged into plastic containers for shipment and further processing. The product is useful as rheological additive or emulsifier into paints, cosmetic and pharmaceutical formulations of other products.

EXAMPLE 2

The primary dried and ground polymer from the first stage of Example 1 is processed as follows:

40 weight parts of NaOH and 125 weight parts of 2-aminoethylenesulfonic acid are dissolved in 500 weight parts of distilled water.

3700 weight parts of the pellets from the 1st stage hydrolyzate from Example 1 were swelled in 3500 weight parts of distilled water and left 24 hours at ambient temperature.

Then 665 weigh parts of the NaOH-Taurine solution is added, thoroughly mixed in closed container for 25 hrs at ambient temperature. Then temperature is increased to 70 oC. for 48 hrs to commence aminolysis of the residual CN groups.

Resulting copolymer has three types of blocks:
PAN hydrophobic blocks
Hydrophilic blocks containing sodium acrylate, acrylamidine and acrylamide
Hydrophilic blocks containing 2-sulfoethyl-N-acrylamidine, N- sulfoethylacrylamide, acrylamide, acrylamidine and sodium acrylate.

The hydrogel product is cooled to ambient temperature for storage in closed plastic bins. It can be diluted with water to a concentration between about 0.05 and 0.5 % by weight and used as rheological additive and emulsifier within a wide range of pH.

EXAMPLE 3

5000 weight parts of polyacrylonitrile copolymer containing 94 molar % of acrylonitrile and 6 molar % of methylacrylate and having weight average molecular weight of 110,000 Dalton is dissolved in solution of 16300 weight parts of water, 2400 weight parts of calcium thiocyanate and 18000 weight parts of sodium thiocyanate. PAN is gradually added to the agitated solution until substantially dissolves to a viscous Solution A. Solution A is stirred for another 6 hours at approximately 60° C. to complete the dissolution and then cooled down to ambient temperature below 22° C.

Solution B is prepared in another vessel. 1000 weight parts of NaOH are dissolved in solution containing 5000 weight parts of sodium thiocyanate and 4000 weight parts of deionized water (DIW) at ambient temperature.

11700 weight parts of Solution A are mixed with 615 weight parts of Solution B and stirred in a glass-lined reactor at 25° C. The reaction mixture is pumped under protective nitrogen atmosphere into a grid of multiple glass tubes of diameter 120 mm and overall length of approximately 100 meters. The tubular reactor is placed in water bath thermostated to 70° C. The reaction mixture is kept there for 36 hours. The mixture quickly darkens and solidifies, but turns of light brown color and liquefies toward the end of the reaction. The resulting viscous solution is pumped into a collection tank where it is cooled to 20–25° C. Approximately 2% of citric acid are added to neutralize free ammonia and remove its odor.

Resulting viscous solution is extruded through a multiple-orifice nozzle into an excess of water to coagulate the polymer. The resulting hydrogel fibers are then washed several times in water until substantially all solvent residue is removed. Resulting hydrogel fibers contain about 85% by weight of liquid in equilibrium with pure water. If soaked in 0.9% by weight of NaCl, the liquid content decreases to about 78% by weight. Fibers are dried and then ground into a crude powder.

200 weight parts of the copolymer powder is mixed with 500 grams of distilled water and let equilibrate in a closed bin at ambient temperature for 20 hours. Then 112.5 weight parts of 10% by weight aqueous solution of NaOH is added and mixed thoroughly. Temperature is then increased to 70 oC. for 50 hours and cooled to ambient temperature. Resulting hydrogel can be dissolved in concentrated aqueous solution of NaSCN and cast into strong, stable hydrogel membranes containing about 91% of liquid in equilibrium with 0.9% by weight isotonic solution of NaCl. The hydrogel has improved mechanical and thermal stability in comparison with similarly hydrated hydrogel prepared in a single reaction step.

EXAMPLE 4

160 weight parts of acrylonitrile monomer (AN) is dissolved in 837 weight parts of colorless 65% nitric acid. 1.2 weight parts of urea is dissolved in 2 weight parts of water and added to the monomer solution. 1 weight part of 10% by weight aqueous solution of ammonium persulphate is added as initiator. The solution is filled into 1000 ml glass spinning pipette, closed and placed into darkened water bath at 22 oC. for 72 hours and then in to refrigerated bath at 10 oC. for another 240 hours.

After this time, the clear viscous solution is extruded into a coagulation bath to form fibers. Washed hydrogel is a binary multiblock copolymer of acrylonitrile and acrylamide. Hydrogel contains 58% of water in equilibrium with distilled water. The hydrogel is dried and ground to crude pellets. The copolymer consists of approximately 35% of acrylonitrile units and 65% of acrylamide units. 100 weight parts of the pellets are soaked at ambient temperature with 100 weight parts of 10% by weight of lithium hydroxide for 24 hours. Then temperature is increased to 60 oC. for 36 hours and cooled down. The reaction product is a rubbery gel soluble that can be diluted in water to form clear solution. Polymer has two types of hydrophilic sequences:

Sequences A containing mostly acrylamide and sequence B that contains a copolymer with major part of lithium carboxylate and minor part of acrylamidine and acrylamide. This copolymer forms clear aqueous solutions at neutral pH gelling at pH values ranging from about 3.5 and 4.

EXAMPLE 5

Product from example 1 is acidified by phosphoric acid, washed in distilled water, dried in vacuum oven and ground. The fine powder can be readily dispersed in water because of its hydrophilicity but limited swelling in acidified form so that even highly concentrated dispersions can be formed. Then 2 weight parts of triethanolamine (TEA) are added for each weight part of the dry copolymer. The copolymer is neutralized by TEA and increases it swelling considerably to form viscous slurry or even a gel at higher polymer concentrations. The copolymer can be used as part of cosmetic formulations as a thickener or special emulsifier.

What is claimed is:

1. A method of making a multiblock copolymer containing two or more types of sequences of derivatives of acrylic acid with a least one derivative being acrylic acid salt and at least one being acrylamidine which comprises:
    (a) in sequence, a first step being a catalytic reaction of nitrile groups in polyacrylonitrile dissolved in an inorganic aqueous solvent of polyacrylonitrile; and,
    (b) at least one subsequent step being at least one catalytic reaction of nitrile groups in absence of polyacrylonitrile solvents.

2. The method according to claim 1 wherein the said inorganic aqueous solvent is selected from the group consisting of concentrated aqueous solution of sodium thiocyanate, concentrated aqueous solution of sodium thiocyanate mixed with potassium and/or calcium thiocyanate, nitric acid at concentration above 60% by weight, sulfuric acid at concentration higher than 80%, phosphoric acid at concentration higher than 90%, mixture of concentrated nitric acid with sulfuric acid and mixture of concentrated phosphoric acid with sulfuric acid.

3. The method according to claim 1 wherein the said inorganic solvent is substantially removed from the reaction of mixture after the first reaction step by coagulation of polymer into the form of hydrogel and extraction of the resulting hydrogel.

4. The method according to claim 3 wherein the said hydrogel is mixed with a predetermined amount of catalyst and coreagent in a subsequent step after said first step.

5. The method according to claim 4 wherein the said catalyst is alkali metal hydroxide.

6. The method according to claim 5 wherein the said alkali metal hydroxide is added in a predetermined amount proportional to the content of desired carboxyl groups to be formed in a subsequent reaction step.

7. The method according to claim 6 wherein the said coreagent is selected from water and a primary amine of a general formula $H_2N$-Y-X where Y is an aliphatic chain with one to 12 carbons and X is a polar group selected from the group consisting of primary amine, secondary amine, tertiary amine, hydroxyl, carboxyl, sulfo -group, sulfate group or a group having formula $[-O-C_2H_3R]_n$-Z where n is an integer from 1 to 50, R is H or $CH_3$ and Z is H, OH, $OCH_3$.

8. The method according to claim 7 wherein said primary amine is added in a predetermined amount corresponding to the desired conversion of the nitrile groups in a subsequent reaction step.

9. The method according to claim 1 wherein the said polyacrylonitrile has a weight average molecular weight between about 50,000 and about 500,000 Dalton.

10. The method according to claim 1 wherein said reaction steps are carried out at temperatures ranging from 40 to 100° C.

11. The product resulting from the method of claim 1.
12. The product resulting from the method of claim 2.
13. The product resulting from the method of claim 3.
14. The product resulting from the method of claim 4.
15. The product resulting from the method of claim 5.
16. The product resulting from the method of claim 6.
17. The product resulting from the method of claim 7.
18. The product resulting from the method of claim 8.
19. The product resulting from the method of claim 9.
20. The product resulting from the method of claim 1.

* * * * *

UNITED STATES PATENT AND TRADEMARK OFFICE
CERTIFICATE OF CORRECTION

PATENT NO.    : 6,451,922 B2
DATED         : September 17, 2002
INVENTOR(S)   : Vladimer A. Stoy et al.

It is certified that error appears in the above-identified patent and that said Letters Patent is hereby corrected as shown below:

Column 3,
Line 66, "reactions of [nitrites]" should be -- reactions of nitriles --;
Line 67, "the firt- stage" should be -- the first stage --;

Column 4,
Line 16, " "and properties of the resulting hydro-gel" should be -- and properties of the resulting hydro-gel --; and Column 12,
Line 65, "from the method of claim [1]" should be -- from the method of claim 10 --.

Signed and Sealed this

Fourth Day of February, 2003

JAMES E. ROGAN
*Director of the United States Patent and Trademark Office*